W. WARD.
Thill Coupling.

No. 77,687.

Patented May 5, 1868.

Witnesses

Inventor
Walter Ward.
By atty A.B. Stoughton.

United States Patent Office.

WALTER WARD, OF MOUNT HOLLY, NEW JERSEY.

Letters Patent No. 77,687, dated May 5, 1868.

IMPROVEMENT IN SHAFT-ATTACHMENT TO WAGONS.

*The Schedule referred to in these Letters Patent and making part of the same.*

TO ALL WHOM IT MAY CONCERN:

Be it known that I, WALTER WARD, of Mount Holly, in the county of Burlington, and State of New Jersey, have invented certain new and useful Improvements in Shaft-Attachments for Wagons, &c.; and I do hereby declare the following to be a full, clear, and exact description of the same, reference being had to the accompanying drawings, making a part of this specification, in which—

Similar letters of reference, where they occur in the separate figures, denote like parts of the shaft-connection in all of the drawings.

Figure 1:
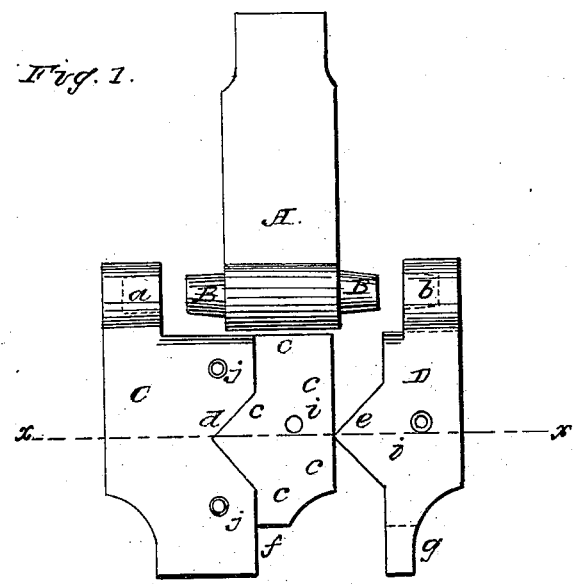
Figure 1 represents the three members or pieces which constitute, when put together, the device for fastening a shaft or thills to a carriage, wagon, &c.
Figure 2:
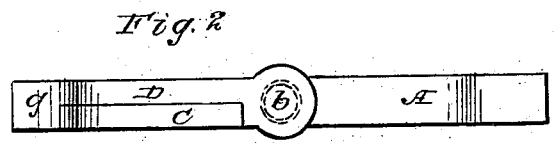
Figure 2 represents an edge view of the same.
Figure 3:
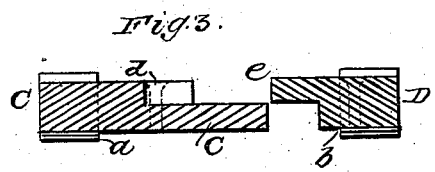
Figure 3 represents a section taken at the red line $x$ $x$ of fig. 1.

The bolts that unite carriage-shafts to the axle, or other parts of the vehicle, are apt, by the jar and use, to be shaken out, and frequently cause serious accidents, by the frightening of the horse or team, caused by the dropping of the shaft or thills, or the failure of the loosened shafts to guide the carriage. Many devices have been essayed to prevent these shaft-bolts from dropping out, and the casualties contingent thereon, but none of them have been sufficiently simple and effective to go into common use.

My invention consists in a divided or sectional plate or bar for holding the shaft-bar, which is so made as to embrace and hold the pivots or bolt in closed sockets or bearings, said plate having overlapping portions or locking-joints, that, when held together by an ordinary screw or rivet, makes it impossible for the shaft to become detached therefrom.

To enable others skilled in the art to make and use my invention, I will proceed to describe the same with reference to the drawings.

A may represent the shaft-iron or bar, which may have its journals, B, cast in it, if made of cast (malleable) iron, or which may be forged in, if made of wrought iron. It is not necessary, however, that the journals should be fast in, or made a part of the bar or iron, A, for it may be simply a pin or bolt slipped loosely through an eye made in the shaft-iron. Either plan will answer the purpose, and still prevent the shaft-fastening from becoming loose.

C D are the two parts, which, when put together, and fastening by a screw or rivet, hold the shaft-iron so that it cannot get loose therefrom, but can freely turn or move therein, as follows:

$a$ is a recess in the part C, and $b$ is a recess in the part D. These two recesses, which are closed at their bottom, receive the journals or shaft-bolt B when slipped up together. On the part C there is a recess, $c$, from which projects an angular recess, $d$, whilst the after portion, $f$, of this recess is cut away, as shown in the drawings. The piece D fits into the recess $e$, and its projection, $e$, takes into the angular recess $d$, and a projection, $g$, at its rear, occupies the cut-away portion at $f$.

When the two parts are thus put together, with their overlapped or interlocked parts thus arranged, a screw or rivet passed through the holes $i$ $i$ in said plates unites the whole firmly together.

The pieces D C may be of malleable cast iron, and thus very cheaply made.

$j$ $j$ are the holes by which the shaft-coupling may be attached to the carriage, and by carriage I mean any vehicle, conveyance, or machine drawn by horses, or wherein shafts, or thills, or a tongue is used.

Having thus fully described my invention, what I claim therein as new, and desire to secure by Letters Patent, is—

A carriage-shaft or thill-connection or coupling, made of the pieces A, B, C, D, interlocked or breaking joint with each other, and firmly united, so that the shaft or thills cannot become detached, substantially as herein described and represented.

WALTER WARD.

Witnesses:
PHILIP F. SLACK,
GEO. T. SLACK.